United States Patent Office 3,397,782
Patented Aug. 20, 1968

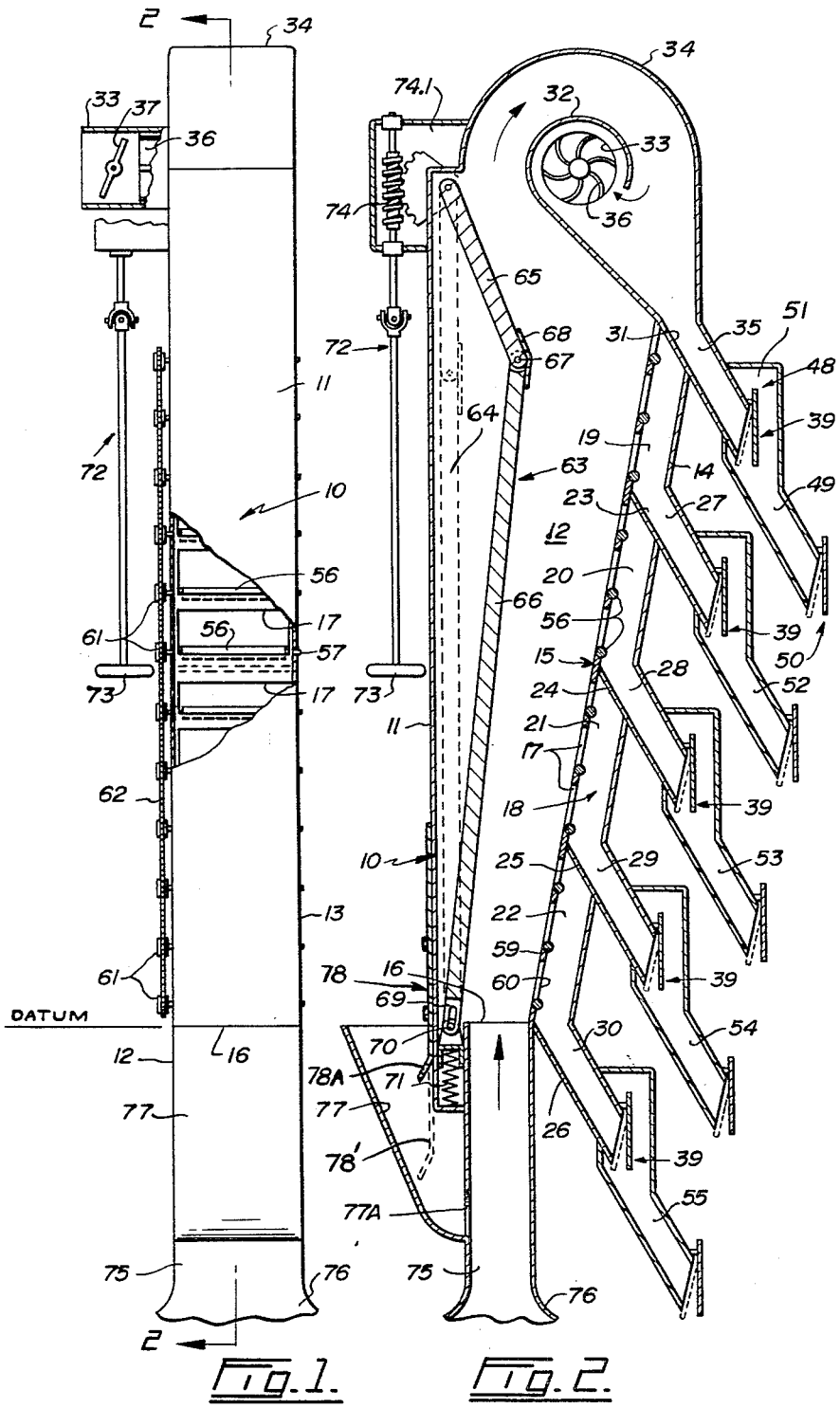

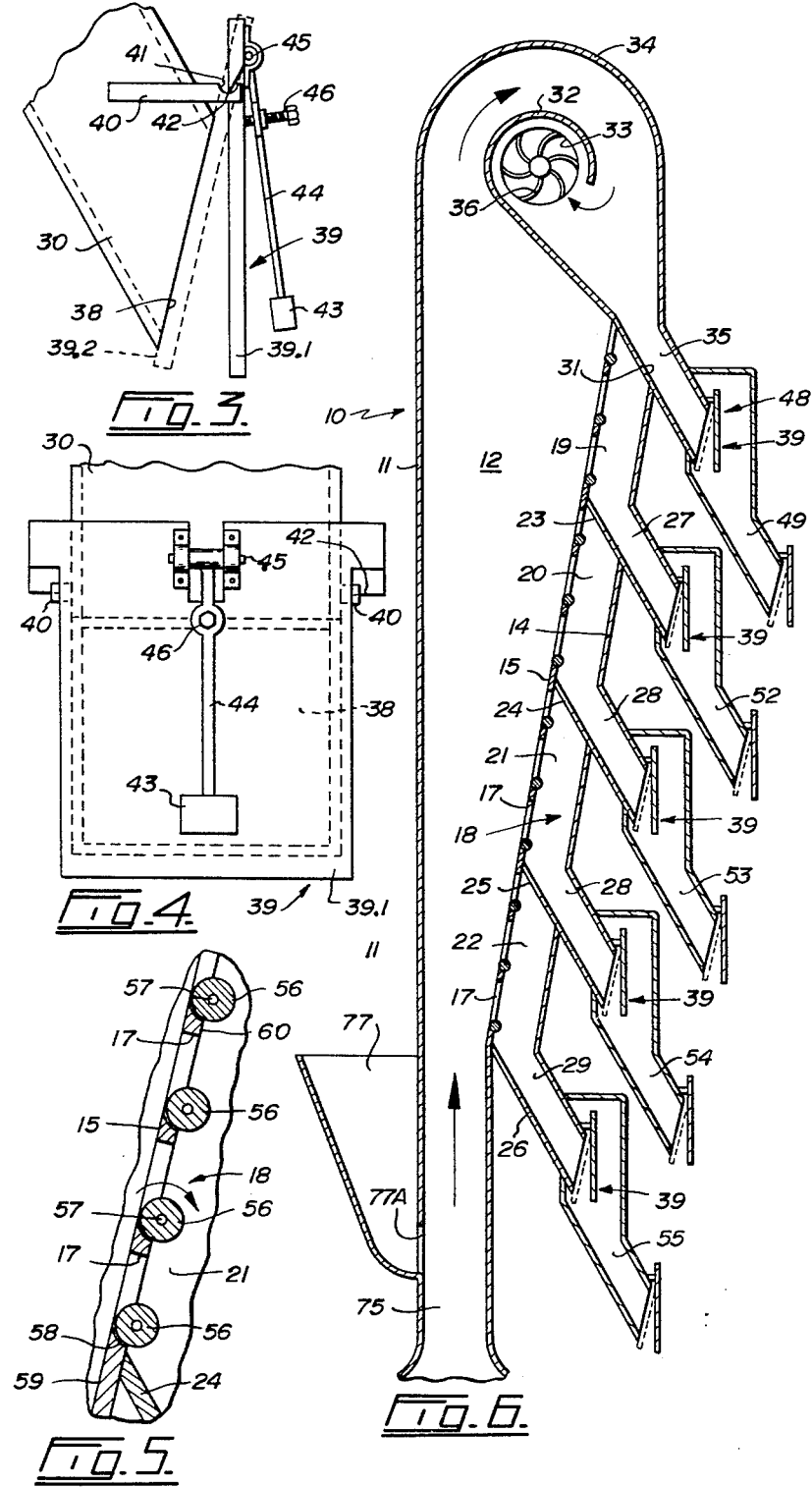

3,397,782
MATERIAL SEPARATOR
Chao C. Kwong and Raymond L. Kwong, both of 3210 W. 4th Ave., Vancouver, British Columbia, Canada
Filed Jan. 19, 1966, Ser. No. 521,675
7 Claims. (Cl. 209—477)

ABSTRACT OF THE DISCLOSURE

A pneumatic material separator including a generally vertical hollow chamber having an upwardly increasing cross-section in which upwardly flowing air causes material particles to stratify in vertical zones according to their floating characteristics, and means to remove said particles from said zones.

---

Our invention relates to a pneumatic material separator, for grading and separating materials of various kinds—for instance, wheat, tea, wood chips—and for the removal of certain foreign material, particularly dense foreign material, therefrom.

It is known that a particle falling freely in still air does not continue to accelerate, but reaches a maximum velocity known as the terminal velocity. Thus, a particle in a stream of air moving upwards at a speed equal to the terminal velocity of that particle will be suspended—that is, the particle will "float."

Where:

$V_f$=floating velocity in feet/minute,
$SG$=specific gravity of the material referred to water,
$d$=the diameter of the equivalent cross-section of the particle in inches, the floating velocity is given by, $$V_f = 3250[SG \cdot d]^{1/2} \quad (1)$$

The formula above is as given at page 615, "Fan Engineering," 5th edition, published by the Buffalo Forge Co., Buffalo, N.Y., U.S.A.

Table I shows floating velocities of typical materials computed from (1) above.

TABLE I
[Computed Floating Velocities]

| (1) Mixed Batch | (2) Materials | (3) W Bulk Weight, lb./ft.³ | (4) SG | (5) d | (6) $V_f$ |
|---|---|---|---|---|---|
| I | Wheat Flour, pressed | 47 | 1.30 | .0059 | 286 |
| | Cement, Portland | 90 | 2.00 | .0117 | 507 |
| | Sand, Fine | 90 | 2.00 | .0232 | 702 |
| | Glass Pulverized | 162 | 2.60 | .0232 | 800 |
| II | Salt, common table | 48 | 1.32 | .01 | 374 |
| | Saltpeter, granular | 132 | 2.60 | .02 | 740 |
| | Sugar, granular | 57 | 1.50 | .02 | 563 |
| III | Sawdust, Oregon Pine | 32 | .51 | .0625 | 578 |
| | Sawdust, White Pine | 27 | .43 | .0625 | 533 |
| | Wood Chips, Oregon Pine | 32 | .51 | .50 | 1,640 |
| | Wood Chips, White Pine | 27 | .43 | .50 | 1,510 |

It is to be understood that the values of $V_f$ of column (6) are of the nature of averages since a particular $V_f$ would apply only to a particle, or to a body of particles, having the diameter shown in column (5), and the other particular characteristics shown.

The principles above may be embodied in apparatus adapted to separate materials having different floating velocities. Such apparatus would not, as is apparent, be effective to separate different materials in which the product $SG \cdot d$ is substantially the same.

In such apparatus, air is caused to flow upwards through a nearly vertical hollow chamber, the cross sectional area of which increases with height as measured from a datum at the base of the hollow structure, so that the upward velocity of the air flow decreases with height above the datum. The entering velocity of the upwardly flowing air being greater than that of the highest floating velocity of particles to be separated, the material will tend to stratify in vertical zones according to floating velocity classes. Means are provided to introduce material to be separated into the base of the structure, and means are provided to cause material in a stratified zone to be discharged—which discharged material is thus separated, and classified according to the floating velocity range within the zones.

Our invention is distinguished from previous apparatus of this class by novel rotor element means employed to urge the material of a zone to pass through openings of a partition wall to be received in a discharge chamber, and by an air lock including a first flap valve assembly and an outer flap valve assembly at upper and outer ends respectively of a storage-discharge compartment. The flap valves are automatically actuated, being closed by a difference in pressure between the interior of the hollow chamber and the atmosphere, and being opened by the weight of separated material.

The rotor element is particularly useful in the prevention of possible stoppage caused by materials containing leafy or stringy ingredients—which tend to straddle, and hang on to, side edges of discharge openings.

When air commences to flow upward through the hollow structure, the pressure within the chamber being less than atmospheric, outside air will enter through every opening and both the first and the outer valves will move, tending to close. The valves are balanced so that little force is required to move them. While both flap valves may tend to swing somewhat initially, one will close and immediately that happens the other will open as the air pressure upon both sides of the said other valve will then equalize. When it is the outer valve that closes first, the first valve will be open, thus material will pass to the storage-discharge compartment, and be retained therein until sufficient has accumulated so that its weight opens the outer flap valve, thus permitting the retained material to discharge. When the outer flap valve has so opened, air will be admitted to the storage-discharge compartment so closing the first valve. Were the first valve rather than the outer valve to close first, separated material will accumulate in a discharge chamber upstream of the first valve, and will pass to the storage-discharge compartment by gravity when sufficient has accumulated to open the first valve. Thus the first flap valve and the outer flap valve, with the storage-discharge compartment, comprise an air lock effective to discharge separated material without substantial admission of air during the discharge.

Difficulties and complexities inherent in certain previous apparatus are reduced by the above-described means.

In apparatus as described above, there is a fixed ratio between the maximum and minimum air velocities within the chamber. That ratio may typically be 3:1, and accordingly such fixed ratio configurations can deal only with separations to which that particular ratio is adapted. A further feature of our invention is that we overcome this difficulty by providing an adjustably movable wall within the hollow chamber, the wall being constructed and arranged so as adjustably to alter the increase of cross sectional area with height. In this way, we provide apparatus wherein the velocity ratio is variable, which apparatus is thus adapted to separate a wider variety of materials than is the case with fixed ratio equipments.

Examples of apparatus in which principles above are embodied are now described in relation to the drawings.

In the drawings,

FIGURE 1 is a side elevation of a material separator according to the invention, parts being broken away to show interior construction, FIGURE 2 is a section on line 2—2 of FIGURE 1,
FIGURE 3 is a flap valve detail in side elevation,
FIGURE 4 is an end elevation of FIGURE 3,
FIGURE 5 is an enlarged fragmented detail section of a corner portion of a discharge compartment showing rotor members,
FIGURE 6 is a section generally similar to FIGURE 2 showing an alternative embodiment of the invention.

Referring to FIGURES 1 and 2, the numeral 10 indicates generally a hollow structure defined by a sidewall 11, a back wall 12, a front wall 13, each of which are vertical and mutually at right angles and a discharge wall 14. A partition wall 15, at right angles to the front and back walls aforesaid, extends from the top of the hollow structure 10 to a bass 16 thereof, a lower open end of the hollow structure. The said partition converges downwards the sidewall 11 so that, measuring height upward from a datum through the base 16 aforesaid, the cross-sectional area of that portion of the hollow structure defined by the front and back walls, the sidewall 11, and the aforesaid partition wall 15, will be generally rectangular in area, which area will increase with the height of the section above the datum.

The partition wall 15 has a plurality of spaced, horizontally disposed, rectangular, openings 17 communicating with a discharge space designated generally 18 and defined by the partition wall 15, the discharge wall 14, and the back and front walls 12 and 13. The space 18 is divided into a plurality of discharge chambers 19, 20, 21 and 22, by bottom walls 23 through 26 extending from the partition 15 to the discharge wall 14. Downwardly and outwardly disposed inner discharge spouts 27 through 30 are provided, one for each said discharge chamber, communicating therewith through the discharge wall 14, the bottom of each discharge spout being substantially aligned with the corresponding discharge chamber bottom wall. The topmost discharge chamber 19 has a top wall 31 which wall extends inward beyond the partition 15 to a central curved portion 32 forming a baffle extending partially around an exhaust pipe 33. The hollow structure 10 has a curved top wall 34 concentric with the exhaust pipe 33, and extending to and through the discharge wall to form, with a downwardly disposed portion of the upper wall 31 aforesaid, an uppermost inner discharge spout 35. A suitable blower 36 adapted to cause the required upward flow of air is disposed within the exhaust pipe 33, which pipe is also provided with obvious damper means 37 as seen in FIGURE 1 only, downstream of the blower.

An outer end of each inner discharge spout aforesaid is provided with a first flap valve assembly generally indicated by the numeral 39, details of which are shown in FIGURES 3 and 4. Referring to these figures, an inner discharge spout 30 has a downwardly disposed open end 38 cut back at about 15° as shown in FIGURE 3. A bracket 40 is secured in a generally horizontal position to the said spout 30, which bracket has a V-groove 41 to receive a knife edge 42 of a flap element 39.1 of the assembly 39. A counterweight 43 is secured to a lower end of an arm 44 the upper end of which is pivoted at 45 adjacent an upper edge of the flap 39.1, obvious screw means 46 are provided to adjust the position of the counterweight 43 with respect to the flap 39.1, in the position shown in FIGURE 3 the adjustment means 46 is set so that the flap 39.1 hangs freely in a substantially vertical position, and because of the cutback aforesaid, the valve is then open some 15°.

As seen in FIGURE 2, the uppermost inner discharge spout 45 is provided with a storage-discharge compartment 48 terminating in a downwardly disposed second discharge spout 49 substantially concentric with the upper discharge spout 35 aforesaid. An outer end of the second discharge spout 49 has an outer flap valve assembly 50, as previously described with reference to FIGURES 3 and 4. The storage-discharge compartment 48 has an upper portion 51 which is constructed and arranged so as to provide clearance for the first flap valve assembly 39, so that the same shall operate freely. The numerals 52 through 55 designate generally storage-discharge compartment assemblies, including an outer flap valve, as described in detail with reference to the storage-discharge compartment 48.

The spaced openings 17 of the partition 15 are generally horizontal having lower sidewalls. Adjacent each lower sidewall is a rotor member 56. FIGURE 5 is a large scale fragmented detail showing the arrangement of the rotor members, referring to that figure each rotor member 56 is secured to a shaft 57, and is so positioned that the periphery of the roll is just clear of the lower edge 58 of the opening 17 in which it is set, the said lower edge being curved to provide substantially uniform clearance to the rotor periphery aforesaid. The periphery of each rotor member is set to be substantially flush with an inner surface 59 of the partition 17, the diameter of the rotor members is at least sufficient for the shafts 57 to clear an outer surface 60 of the partition. The direction of rotation of the rotor members is clockwise as viewed in FIGURE 5, as indicated by the directional arrow. As seen in FIGURE 1 only, each rotor member 56 extends the full length of the opening 17 with which it is associated, and the ends of the shaft 57 are journalled in the front and back walls 12 and 13.

At the end of each rotor shaft 57 extending through the back wall 12 a pinion 61 is secured. Endless chain means 62 operatively engage the pinions causing the rotor members to rotate in the required direction, obvious alternative gear trains may be used to rotate the rotor members.

Adjacent the hollow structure sidewall 11 is a movable wall generally indicated by the numeral 63, which wall is adjustably movable between the full line position 63 to a broken line position 64, wherein the movable wall is retracted to be adjacent and substantially parallel to the sidewall 11. The movable wall has an upper element 65 and a lower element 66, which elements are jointed transversely as seen at 67. The joint is substantially airtight, which may be effected for instance by means of a strip of flexible material 68 over the said joint. At a lower end of the lower element 66 are slotted members 69, one of which only is seen in FIGURE 2. Each said slotted member 69 is suitably secured to side edges of the lower element 66, side edges of the slots engage opposite ends of a long horizontal pin 70 secured in opposite walls of the structure. The dead weight of the movable partition is supported by a helical spring near each end of the pin 30, one said spring designated by the numeral 71 is seen in FIGURE 2. Mechanism generally indicated by the numeral 72 permits the movable sidewall to be moved from the full line position 63 to the broken line position 64, or to an intermediate position, by means of a handwheel 73. Any convenient means may be used to effect this motion, the simple worm and sector illustrated in FIGURE 2, as indicated at 74, are satisfactory. The ratio of cross-sectional area at a top zone of the hollow structure opposite the discharge chamber 19 to the cross-sectional area at the datum, is typically 3:1 with the movable wall retracted to the broken line position 64. In the full line position, the ratio is typically about 2:1.

A substantially airtight housing 74.1 is provided to prevent ambient air at atmospheric pressure from entering the hollow chamber 10.

As will later be explained, it is required that junctions of side edges of the movable wall 63 be reasonably airtight with respect to contiguous back and front walls 12 and 13. Adequate leak-proofing may be effected by means of common felt inserts, not shown.

An intake pipe 75 is secured to the lower open end 16 of the hollow structure, the intake pipe terminating in a bell mouth 76. The cross sectional area of the intake pipe is substantially that of the base of the hollow structure, to provide for upwards passage of air as will later be explained. A loading hopper 77 is provided, an opening 77A of which communicates with the intake pipe. As shown in FIGURE 2 only, an adjustable sliding gate, designated generally by the numeral 78, is provided to control discharge of the material from the loading hopper 77. The gate has a lower portion 78A at an obtuse angle to a vertical portion thereof, so as to form a baffle. The numeral 78' indicates, in broken outlines, a partially closed position of the sliding gate—and it is seen that the baffle aforesaid, together with the vertical portion of the sliding gate 78 serves to regulate admission of material to the base of the hollow structure 10, which gate serves also to minimize air infiltration through the hopper.

FIGURE 6 is a sectional view of an alternative embodiment which differs from the embodiment above described in that the hollow cylindrical structure is not provided with a movable wall 63, and accordingly the effective area of cross-section at any height above datum is a fixed quantity, rather than being variable by means of a movable wall. The ratio, as above defined, is typically 3:1, and is a design parameter.

The operation of the material separator is now described.

Referring particularly to FIGURE 2, air entering the intake bell mouth 76 will travel upwards as shown by full line arrows to pass outwards through the exhaust pipe 33 under the action of the blower 36. The velocity of the air at entrance might be 2,100 feet per minute when, with a three-to-one area ratio, the velocity at the top zone opposite discharge chamber 19 would be about 700 feet per minute.

The difference in pressure between air in the interior of the hollow chamber 10 and the atmosphere is small, being of the order of about one inch of water. Referring now to FIGURE 3, with the flap element 39.1 in the full line position shown, air would commence to enter via the discharge spout 30. The flow of air will cause the flap element 39.1 to move to the broken line closed position 39.2, when it will be maintained in that position because of the difference in pressure as above mentioned. It has been explained that the action might not be as above described, that is to say an outer flap valve may close first. Considering a particular associated pair of first and outer flap valves, it is immaterial which closes first, but both will not remain closed at the same time unless one is leaking. The cutback of about 15° at open ends of discharge spouts, such as the discharge spout 30, in combination with the balance weight adjustment means 46, provide nice individual adjustment to each valve so that the operation may be satisfactory under different conditions.

Material to be separated is now introduced into the hopper 77, FIGURE 1, when it will pass through the opening 77A to be carried upwards by the upflowing air stream. Dense foreign material, for instance metal objects in wheat, will immediately fall to a waste discharge hopper, not shown. The remainder of the material will be carried upwards and will stratify into zones according to the floating velocities of the particular particles of which the body of material is composed.

It is found that a body of such particles in a zone, in which the air is moving at substantially their floating velocity, will not remain stationary but will orbit or circulate. It is seen that the partition wall 15 is inclined to the vertical, which inclination is suitably 10 or 15 degrees, hence the action of gravity, combined with the circulating motion of the particles as above described, will cause the particles in a said stationary zone progressively to pass through an opening 17 to an opposite discharge chamber. This tendency is further aided mechanically by the rotor members 56 which are constructed and arranged to urge the particles into a discharge chamber. The discharge spouts slope downwards, hence the separated particles will fall downwards and come to rest against a first flap valve member 39.1 assuming that valve to be closed. When the weight of the collected material is sufficient, the flap valve element 39.1 will open permitting the separated material to pass to a storage-discharge compartment, the flap valve 50 of which will initially be open. However, immediately a first flap element 39.1 opens, the corresponding outer flap valve assembly 50 will close in the same manner as explained with reference to the upper flap element 39.1.

Separated material will now flow directly through the first flap valve to the storage-discharge compartment, and this will continue until the weight of material in the storage-discharge compartment is sufficient to cause the flap valve 50 to open. When this occurs, it is clear that the upper flap valve 39.1 will close. It is thus seen that the combination of the first and outer flap valve aassemblies and the associated storage-discharge compartment form an effective airlock to provide discharge of the separated material without material admission of air.

The outer flap valve assembly 50 being closed, material reaching a storage-discharge compartment will, as above explained, be held there until such time as the accumulated weight of the separated material suffices to open the valve, when it will pass outwards to a hopper or other collecting means, which are not shown as being well known and not being any part of our invention.

It has been explained that an outer flap valve 50, rather that a first flap valve 39.1 may close first—in which case the separated material will pass directly to the associated storage-discharge compartment.

It is to be pointed out that material, the floating velocity of which is less than that of the velocity of the air in the uppermost zone of the hollow structure, will be continued to be carried upwards, around the curved upper portion of the hollow chamber, eventually to be discharged through the uppermost discharge spot 35. Such material would generally be chaff, but could be material which is required to be collected for a further separation cycle. It is also to be noted that centrifugal force will prevent the chaff, or a part of it, from being drawn through the exhaust pipe 33.

In the preceding description it has been implicit that either the movable wall 63 is maintained in a particular position, or that the embodiment is as FIGURE 6—a fixed rather than a movable wall version.

In the case of the fixed wall alternative, the ratio of the area of the hollow structure in the uppermost zone (opposite discharge chamber 19) to that of the area at the datum, that is to say at the base of this structure, is fixed. Factors governing the velocity, in the vicinity of the datum and at the top zone of the hollow structure as aforesaid in relation to the particular material being separated are matters of design well known in the art.

These parameters may be calculated for a particular installation and, where material of a particular kind only is to be separated, there is little or no advantage in using a movable wall.

However, in many installations, it will be apparent that a movable wall would be of considerable advantage. Partimularly, it may be used to alter the separation characteristics at will within the limits of adjustment and can move a particular zone upwards or downwards as may be required.

As before stated, the parameters of a particular installation are design matters, a typical installation might be six or seven feet high having a maximum ratio of upper zone cross-sectional area to cross-sectional area at the datum of about 3:1.

The angle which the partition makes with the vertical is a matter of design and will depend upon the nature of the material being separated, and upon other design factors. In practice the angle may be from about five degrees to, as a practical maximum, about twenty or thirty degrees. The downward slope of the several discharge spouts is not critical, so long as it is in excess of the angle of repose of the separated material. As illustrated in the figures the slope is about thirty degrees which is satisfactory and may be considered to be typical.

Referring to FIGURES 3 and 4, many well known equivalents to obtain adjustable balance of a flap door element 39.1 will occur to those skilled in the art. It is important only that balancing means be provided which will effect the result described.

Referring now to the rotor members 60 (as best seen in FIGURE 5) the rotor diameter is not critical, diameter of from about one-quarter to about a third the width of a slot is satisfactory. It is apparent that, rather than positioning said rotors at bottom edges of the slots and causing them to be rotated in a clockwise direction, the rotor elements could be located at the top of the slots and rotated in a counterclockwise direction. A slot may be provided with two oppositely rotating elements, one at the top and one at the bottom. As well, depending upon the nature of the material, the outer periphery of a roll may be corrugated. In summary, the size and position of the rotor member is not important, what is essential to this part of the structure of our invention is a rotor member constructed and arranged to urge the stratified particles to pass through opening 17.

Referring to the movable wall 63 in FIGURE 2, the particular mechanism shown is simple and effective. Many alternatives will be apparent to those skilled in the mechanical art and any equivalent may be used to effect substantially similar adjustment. The purpose of the helical spring arrangement 71 is to support the dead weight of the movable wall 63 so that, in moving the wall, only inertia and friction are to be overcome. In a manual arrangement as illustrated in FIGURE 2 this is of value—with power operation of the movable wall 63, a spring to take the dead weight would be of less importance.

The blower 36 includes electric motor driving means, two or three HP is usually adequate. The quantity of air passing through the hollow structure 10, hence its velocity, is regulated by the damper means 37—which is manually operated in an ordinary way. We prefer to have capacity for an initial velocity at entrance of 4000 or 5000 ft./min. A variable speed motor may be used either alone, or in combination with a damper. A variable speed motor is not necessary and is likely to result in greater first cost without reduction in operating cost. Accordingly, we prefer damper velocity control means.

It is desirable to incorporate a fan blower with the separator to make it a more nearly self-contained unit. If the blower is to be placed within the exhaust pipe 33, an axial flow type of fan is suitable. However, the exhaust air is usualy dust laden, and dust, when impinged on the fan blades, tends to stick on them and throw them out of balance. In such cases, the fan should be installed outside of the exhaust 33, preferably protected by a dust collector of any conventional design.

What is claimed is:
1. Apparatus for separating materials into stratified zones of particles having different floating velocities, the separating being effected by a stream of air flowing upwards through a generally vertical hollow structure having a cross section the area of which varies inversely with height above a datum taken at an open base end of the structure, the said hollow structure having a downwardly converging partition wall including a plurality of spaced, horizontally disposed, openings communicating with discharge chambers adapted for discharge of the separated material, and a loading hopper for introduction of material to the base of the hollow structure; in combination with the foregoing,
(a) an air lock including a first flap valve assembly and an outer flap valve assembly at inner and outer ends respectively of a downwardly sloping storage-discharge compartment communicating with a discharge chamber at an outlet thereof, and being constructed and arranged so that a difference in pressure between the air flowing through the hollow chamber and that of the atmosphere closes a said flap valve, and so that the said closed flap valve will open from the weight of separated material upon an inner surface thereof, which opening causes the remaining flap valve to close from the difference in pressure aforesaid,
(b) a flap valve having balance means adjustably to control a freely hanging open position thereof,
(c) and a generally cylindrical rotor member disposed with a surface thereof adjacent a horizontal side wall of an opening in the partition wall, adapted so that rotation of the rotor member urges stratified particles of a zone to pass through the opening and into a discharge chamber.

2. Apparatus as defined in claim 1, wherein the loading hopper has a vertically sliding gate, including a lower baffle portion bent at an obtuse angle to a vertical portion of the gate, the gate being constructed and arranged to regulate introduction of material to the base of the hollow structure and to minimize infiltration of air.

3. Apparatus as defined in claim 1, wherein the hollow chamber has an adjustably movable wall, movement of which alters the rate of variation of the cross sectional area with the height above the datum.

4. Apparatus as defined in claim 3, wherein the movable wall has an upper element, a lower element hingedly joined to a lower edge of the upper element, a lower edge of the lower element mounted for swinging motion with respect to an adjacent side wall, and means to rotate the upper element about an upper edge thereof, adapted to cause the lower element to be retracted to be substantially parallel to and close to the adjacent side wall, or to be swung at an angle to the adjacent side wall, according to the amount of rotation of the upper element, and an adjustable sliding gate in the hopper to regulate admission of material to the base aforesaid.

5. Apparatus as defined in claim 4, wherein the loading hopper has a vertically sliding gate, including a lower baffle portion bent at an obtuse angle to a vertical portion of the gate, the gate being constructed and arranged to regulate introduction of material to the base of the hollow structure and to minimize infiltration of air.

6. Apparatus as defined in claim 4, wherein the downwardly converging partition wall is at an angle of between about 5° and about 30° to the vertical, and wherein the ratio of the cross sectional area at the datum to the cross sectional area at the joint between the upper and lower elements of the movable side wall is adjustable, as aforesaid, between approximate limits of from 1:2 to 1:3.

7. Apparatus as defined in claim 6, wherein the loading hopper has a vertically sliding gate, including a lower baffle portion bent at an obtuse angle to a vertical portion of the gate, the gate being constructed and arranged to regulate introduction of material to the base of the hollow structure and to minimize infiltration of air.

References Cited

UNITED STATES PATENTS

| 306,822 | 10/1884 | Fritzinger | 209—246 X |
| 409,025 | 8/1889 | Downton | 55—426 |
| 781,722 | 2/1905 | Heaton | 222—449 X |
| 1,133,721 | 3/1915 | Gregg | 209—160 X |
| 1,171,058 | 2/1916 | Liggett | 209—246 X |
| 1,435,382 | 11/1922 | Dimmick | 209—141 X |
| 2,265,707 | 12/1941 | Wall | 55—432 X |
| 2,792,910 | 5/1957 | Redniss | 209—144 |
| 2,890,081 | 6/1959 | Terrett. | |

FOREIGN PATENTS 1,226,122  2/1960  France.

BARRY B. THORNTON, *Primary Examiner.*

TIM R. MILES, *Assistant Examiner.*